(12) United States Patent
Santucci et al.

(10) Patent No.: US 10,654,403 B2
(45) Date of Patent: May 19, 2020

(54) MOTORCYCLE COMPRISING AN AUXILIARY LIGHTING DEVICE

(71) Applicant: PIAGGIO & C. S.P.A., Pontedera (Pisa) (IT)

(72) Inventors: Mario Donato Santucci, Pontedera (IT); Stefano Bartolozzi, Pontedera (IT)

(73) Assignee: PIAGGIO & C. S.P.A., Pontedera (Pisa) (IT)

( * ) Notice: Subject to any disclaimer, the term of this patent is extended or adjusted under 35 U.S.C. 154(b) by 0 days.

(21) Appl. No.: 16/312,944

(22) PCT Filed: May 25, 2017

(86) PCT No.: PCT/IB2017/053088
§ 371 (c)(1),
(2) Date: Dec. 21, 2018

(87) PCT Pub. No.: WO2018/002741
PCT Pub. Date: Jan. 4, 2018

(65) Prior Publication Data
US 2019/0337444 A1 Nov. 7, 2019

(30) Foreign Application Priority Data
Jun. 28, 2016 (IT) .......... 102016000066999

(51) Int. Cl.
*B62J 33/00* (2006.01)
*B60Q 1/18* (2006.01)
*B62J 6/02* (2020.01)

(52) U.S. Cl.
CPC . *B60Q 1/18* (2013.01); *B62J 6/02* (2013.01)

(58) Field of Classification Search
CPC .......... B62J 2006/006; B62J 6/02; B62J 6/04; F21W 2107/17; B60Q 1/54
See application file for complete search history.

(56) References Cited

U.S. PATENT DOCUMENTS 4,922,390 A * 5/1990 Nakazawa ............. B60Q 1/115
362/282
8,550,673 B1 * 10/2013 Jones, Jr. ................. B60Q 1/12
362/464
(Continued)

FOREIGN PATENT DOCUMENTS

EP 2130713 A1 12/2009
EP 2669161 A1 12/2013
JP 2014118135 A 6/2014

OTHER PUBLICATIONS

RawGadgets, "Harley Logo", Mar. 9, 2013, Youtube, https://www.youtube.com/watch?v=eAkVDT1Sn88 (Year: 2013).*
(Continued)

*Primary Examiner* — Matthew J. Peerce
(74) *Attorney, Agent, or Firm* — Cantor Colburn LLP

(57) ABSTRACT

A motorcycle (1) including: a motorcycle body (2,3,4) extending along a longitudinal axis (L-L) and having a front part (2), a tail part (4) and a central part (3) comprised between the front part (2) and the tail part (4); at least two wheels (5,6) constrained to the motorcycle body (2,3,4), including a front wheel (5) and a rear wheel (6); a traction engine (7) constrained to the motorcycle body (2, 3, 4) and operatively connected to at least one of the wheels (5, 6); at least one headlight (12) fixed to the front part (2); at least one rear light (14) fixed to the tail part (4). The motorcycle (1) further includes a first auxiliary lighting device (30) fixed to the motorcycle body (2,3,4) and adapted to be electrically controlled in order to be activated and deactivated, wherein the first auxiliary lighting device (30) is arranged and oriented so that, when activated, it lights a ground portion (G1) being on the side and/or under the central part (3) of the motorcycle body (2,3,4).

12 Claims, 3 Drawing Sheets

(56) References Cited

U.S. PATENT DOCUMENTS

| | | | | |
|---|---|---|---|---|
| 2003/0197606 A1* | 10/2003 | Epstein | ................... | B60Q 1/54 |
| | | | | 340/466 |
| 2006/0077678 A1* | 4/2006 | Chen | ....................... | B62J 6/003 |
| | | | | 362/475 |
| 2007/0223240 A1* | 9/2007 | Brown | .................... | B60Q 1/18 |
| | | | | 362/473 |
| 2008/0088423 A1* | 4/2008 | Liu | ......................... | B62J 6/005 |
| | | | | 340/432 |
| 2017/0101147 A1* | 4/2017 | Hasegawa | ............... | B60Q 1/44 |

OTHER PUBLICATIONS

International Search Report for corresponding application PCT/IB2017/053088 filed on May 25, 2017; dated Aug. 29, 2017.
Written Opinion of the International Searching Authority for corresponding application PCT/IB2017/053088 filed on May 25, 2017; dated Aug. 29, 2017.

\* cited by examiner

MOTORCYCLE COMPRISING AN AUXILIARY LIGHTING DEVICE

The present description relates to the technical field of motorcycles and in particular it relates to a motorcycle including an auxiliary lighting device.

Lighting systems on board motorcycles allowing to safely use the motorcycles thereof have been used for a long time. Motorcycles are in fact provided with a headlight, a rear light, direction indicators, etc. The headlight allows to light a ground area arranged at the front of the motorcycle and to make the motorcycle visible to people placed in front of the motorcycle. The rear light allows to make the motorcycle visible to people placed behind it and to signal the lighting of the brakes.

However, the prior art lighting systems do not allow the motorcycle driver to carry out the stopping and/or parking operations safely enough, as, due to different levels of the ground and/or due to ground compliance conditions and/or to the presence of slippery materials during the stopping and parking operations, a loss of balance of the motorcycle or of the driver can occur thus determining injuries to the driver and/or damages to the motorcycle thereof.

One general object of the present description is to provide a motorcycle having an auxiliary lighting device allowing to overcome or reduce, at least partially, the drawbacks of the prior art motorcycles.

This and other objects are obtained through a motorcycle as defined in claim 1 in its more general form, and in the claims dependent from it in some of its peculiar embodiments.

The invention shall be better understood from the following detailed description of embodiments, for exemplary purposes and not limited to the enclosed drawings, wherein.

In the enclosed figures, same or similar elements will be indicated by the same reference numbers.

Figure 1:
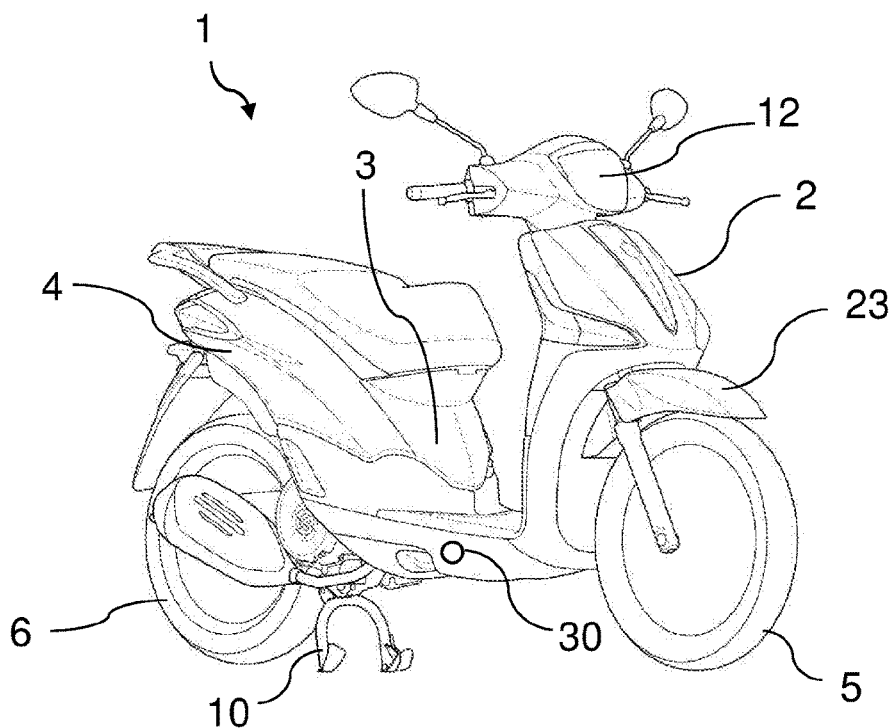
FIG. 1 shows a perspective view of one embodiment of a motorcycle.
Figure 2:
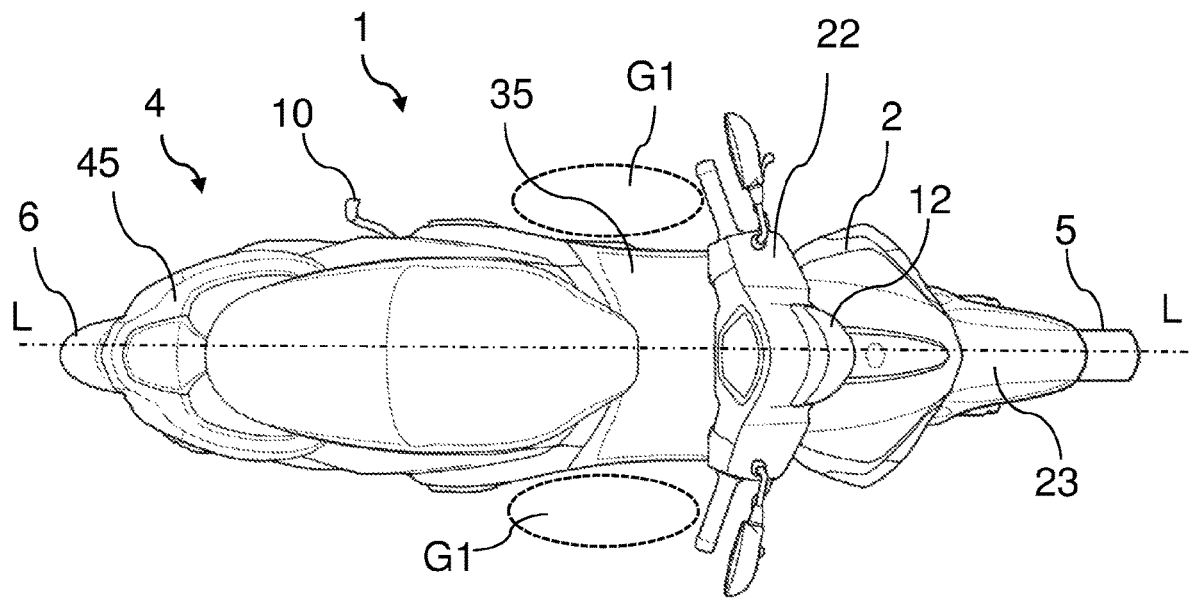
FIG. 2 shows a plan view of the motorcycle of FIG. 1.

In the enclosed FIGS. 1-4 one embodiment of a motorcycle 1 is shown, that in the specific represented example, is embodied, without limitation, by a two-wheel motorcycle and in particular a two-wheel scooter, having a front wheel 5 and a rear wheel 6.

In the hereinafter description reference will be made to a generic motorcycle 1, thereby meaning that the following description is applicable in general to any type of motorcycle 1 of Category L including:

a motorcycle body 2,3,4;
at least two wheels 5,6 constrained to the motorcycle body 2,3,4;
a traction engine 7, e.g. thermal or electric or hybrid, constrained to the motorcycle body 2,3,4 and operatively connected to at least one of the two wheels 5,6.

For example the aforesaid motorcycle 1 is a two-wheel motorcycle, as for example a scooter or a motorbike, or a three-wheel motorcycle whereof at least two front wheels are steering and tilting, or a quadricycle provided with two pairs of tilting wheels and at least two steering wheels.

The motorcycle body 2,3,4 extends along a longitudinal axis L-L, that is parallel to the running axis of the motorcycle 1, and has a front part 2, a tail part 4 and a central part 3 comprised between the front part 2 and the tail part 4. The central part 3 represents the part of the motorcycle 1 where the body of the driver is arranged mounting the motorcycle 1 or riding the motorcycle 1 in a normal condition of use of the motorcycle 1. In the example, the central part includes a platform 35, a support placed under the saddle 36, and a front portion 37 of the saddle. In the example, the front part 2 includes a front shield 21, a steering handlebar 22, the front wheel 5, a front mudguard 23. In the example, the rear part 4, includes a back portion 47 of the saddle, a storage container 45, one or two back suspensions 41, the back wheel 6, the traction engine 7.

The motorcycle 1 includes at least a front headlight 12 fixed to the front part 2 and at least one back light 14 fixed to the tail part 4 and directed towards an opposite direction with respect to the headlight 12. When the steering handlebar 22 is not rotated, that is, when both the front wheel 5 and the back wheel 6 are aligned along the longitudinal axis L-L, the headlight 12 is such to emit an optical beam mainly centred along the longitudinal axis L-L and headed towards a ground portion arranged at the front with respect to the motorcycle 1. The rear light 14 is such to emit an optical non-orientable radiation, usually concentrated at the same height of the rear light thereof in order to avoid to dazzle vehicles that follow the motorcycle 1.

The motorcycle 1 also includes a first auxiliary lighting device 30 fixed to the motorcycle body 2,3,4 and adapted to be electrically controlled in order to be activated and deactivated, wherein the first auxiliary lighting device 30 is arranged and oriented so that, when activated, it lights a ground portion G1 being on the side and/or under the central part 3 of the motorcycle body 2,3,4. Preferably, the first auxiliary lighting device 30 is arranged and oriented in such a way that, when activated, it selectively lights the aforesaid portion of ground G1. For the purposes of the present invention by selectively it is meant mainly or exclusively. Preferably, the first auxiliary lighting device 30 is arranged on the motorcycle body 1 in the middle, or substantially in the middle, between the front wheel 5 and the rear wheel 6.

According to one advantageous embodiment, the first auxiliary lighting device 30 is arranged in the central part 3 of the body of the motorcycle 1 and it is oriented towards the ground. In one example consistent with the embodiment represented in the Figures, the motorcycle 1 is a scooter and the central part 3 of the motorcycle body 2,3,4 includes a platform 35 and the first auxiliary lighting device 30 is placed beneath the platform 35, in particular below a step up wall of the platform 35.

Preferably the first auxiliary lighting device 30 has a main emission optical axis D1 being oriented in a direction transversal to the longitudinal axis L-L and facing the ground. This can be obtained using a direct optical source, as for example a LED, and/or using an optical system for example including at least one lens and/or at least one spotlight able to spatially shape the optical radiation emitted by a non-direct optical source, as for example an incandescent light or a halogen light. Preferably, the aforesaid optical source cannot be seen looking at the motorcycle 1 from an observation point behind the motorcycle 1 along the longitudinal axis L-L when the motorcycle is running.

According to one advantageous embodiment, the motorcycle 1 includes an electronic control unit 100 operatively connected to the first auxiliary lighting device 30 in order to activate and deactivate it. The electronic control unit 100 is such to automatically activate the second lighting device 30 when the speed of the motorcycle 1 is lower than a threshold speed. Conveniently, the threshold speed has an absolute value higher than zero. For example, the threshold speed is equal to 10 km/h or equal to 5 km/h. According to one embodiment, referring to FIG. 5, the electronic control unit 100 is such to receive, for example from a speed sensor 102 mounted on board the motorcycle 1 or connected operatively thereof, an electric signal bearing information related to the motorcycle speed 1.

For example, the electronic control unit 100, as well as the first auxiliary lighting device 30, is fed by one battery 101 of the motorcycle 1.

Figure 5:
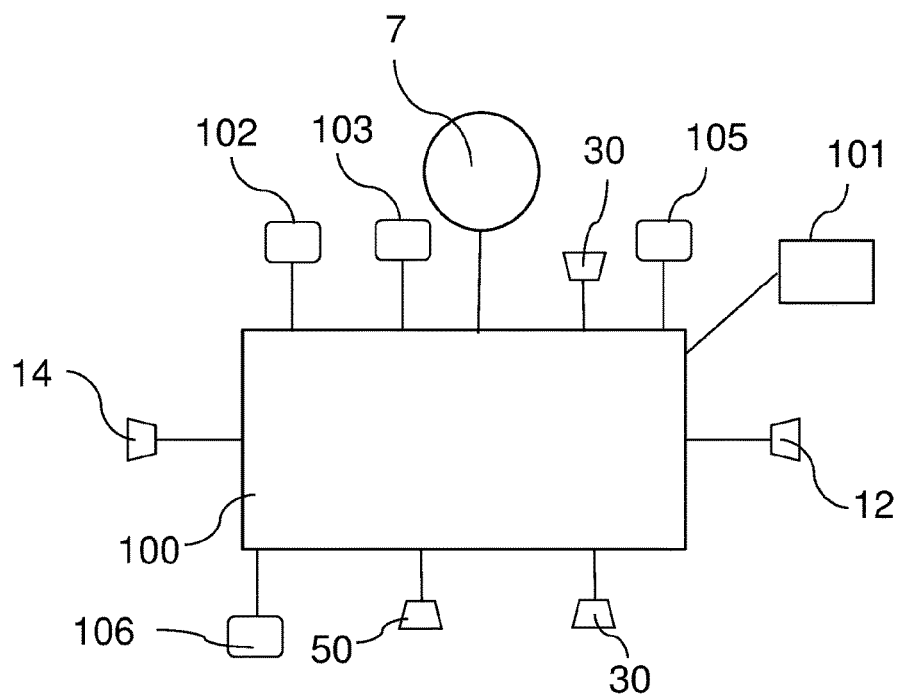
FIG. 5 shows a functional block diagram of one exemplary embodiment of one electronic control unit of the motorcycle of FIG. 1.

Always referring to FIG. 5, according to a non-limiting embodiment, the electronic control unit 100 is the ECU (Engine Control Unit) of the motorcycle 1 and is such that it controls the traction motor 7 too of the motorcycle 1.

According to one advantageous and non-limiting embodiment, the first auxiliary lighting device 30 includes one pair of auxiliary lighting devices placed at opposite sides between them with respect to the longitudinal axis L-L.

According to an advantageous embodiment, the motorcycle 1 also includes a twilight sensor 105 operatively connected to the electronic control unit 100. The electronic control unit 100 is programmed to keep the first auxiliary lighting device 30 off, regardless of the speed of the motorcycle 1, to the detection of a certain degree of ambient lighting. Thereby, it is possible to avoid to activate the first auxiliary lighting device 30 when not required by circumstances.

According to one further embodiment, the motorcycle 1 includes one radio interface 103 operatively connected to the electronic control unit 100. The electronic control unit 100 is programmed to activate the first auxiliary lighting device 30 when the speed of the motorcycle 1 is equal to zero and when it receives a radio control signal from the radio interface 103. Thereby, it will be advantageously possible to use the first auxiliary lighting device 30 also to enable the authorized user of the motorcycle 1 to detect the parking position of the motorcycle 1 when it is dark and from a certain distance. The aforesaid radio interface 103 is for example an interface of a wireless portable device authorizing the use of the motorcycle 1, as for example an alarm controller and/or a keyfob.

According to one advantageous and non-limiting embodiment, the motorcycle 1 includes at least one kickstand 10 adapted to be moved in order to selectively assume a resting operating position and a working operating position, wherein, in the working operating position, the kickstand has at least one end portion leaning against a ground portion being placed laterally and/or under the motorcycle body. Preferably, in such embodiment, the motorcycle 1 includes also one second auxiliary lighting device 50 adapted to light the kickstand 10 or render it luminous. It must be noted that in the FIGS. 1 and 4 the kickstand 10 is shown in the operative working position while in FIG. 3 it is shown in the resting operative position.

According to one preferred embodiment, the second auxiliary lighting device 50 is such as to light the kickstand 10 or render it luminous when the kickstand 10 is in the resting position. For example, it can be observed from the example of FIGS. 3 and 4 that the second auxiliary lighting device is such that it lights a motorcycle 1 portion M and in particular of the tail part of the motorcycle 1 and more precisely one portion M1 of the traction motor 7. Though it is convenient that the second lighting device 50 lights the kickstand 10 or renders it luminous when it is in the resting position, it is however possible to provide that the second auxiliary lighting device 50 is such as to light the kickstand 10 or render it luminous when it is in the working position.

According to one advantageous embodiment, the second auxiliary lighting device 50 is operatively connected to the electronic control unit 100 in order to be activated and deactivated by it, and the electronic control unit 100 is such to activate the second auxiliary lighting device 50 when the speed of the vehicle is equal to zero and/or when the traction engine 7 changes from an on-state to an off-state and/or when the driver getting off from the motorcycle 1 is detected.

According to one non-limiting embodiment, the second auxiliary lighting device 50 is integrated in the kickstand 10, thereby it is such as to render the kickstand luminous. According to one embodiment alternative to the one above described, the second auxiliary lighting device 50 is external to the kickstand, it is fastened to the body 2,3,4 of the motorcycle 1 and it is oriented towards the kickstand when said kickstand is in the resting position, thereby it is such as to render the kickstand luminous.

On the basis of what above described it is thus possible to understand that the motorcycle of the above described type enables to reach the aforementioned objects referring to the prior art state. In fact thanks to the first lighting device 50 a driver can see a portion of ground underlying the motorcycle and/or placed laterally with respect to the motorcycle 1 and choose the most suitable area where to stop and park the motorcycle or simply where to place his feet, so that hazards due to the presence of holes, puddles, cutting objects as glass fragments, stones of uneven floor are avoided.

The above described embodiment is particularly advantageous wherein the first auxiliary lighting device is automatically activated when it detects that the motorcycle speed drops from any positive value below a certain threshold value, so that it activates automatically the aforesaid first auxiliary lighting device 30 when it is likely that the driver is executing a stopping and/or parking operation of the motorcycle 1.

It is possible to provide that, after being activated, the first auxiliary lighting device 30 is automatically deactivated if an event occurs or if it is time-controlled, for example under the control of the electronic control unit 100. It is possible to provide that the motorcycle includes a device adapted to detect the presence of the driver on the motorcycle (called "driver presence sensor 106") operatively connected to the electronic control unit 100 and that it is such as to deactivate the first auxiliary lighting device 30 when it detects that the driver has got off the motorcycle 1 or after a time lapse from such detection. One non-limiting example of driver presence sensor 106 is described in Patent EP2130713 B1, by the same Applicant.

Figure 3:
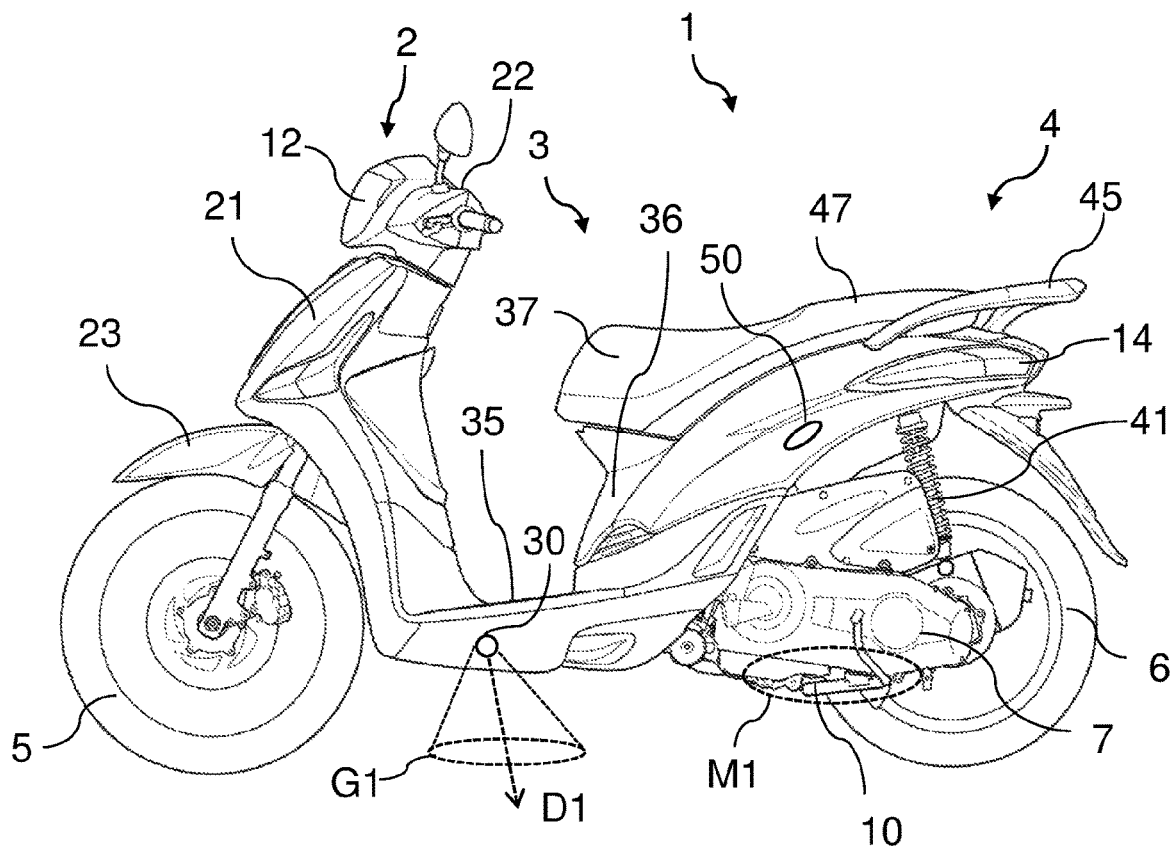
FIG. 3 shows a side view of the motorcycle of FIG. 1, wherein the motorcycle is in one first operative configuration.
Figure 4:
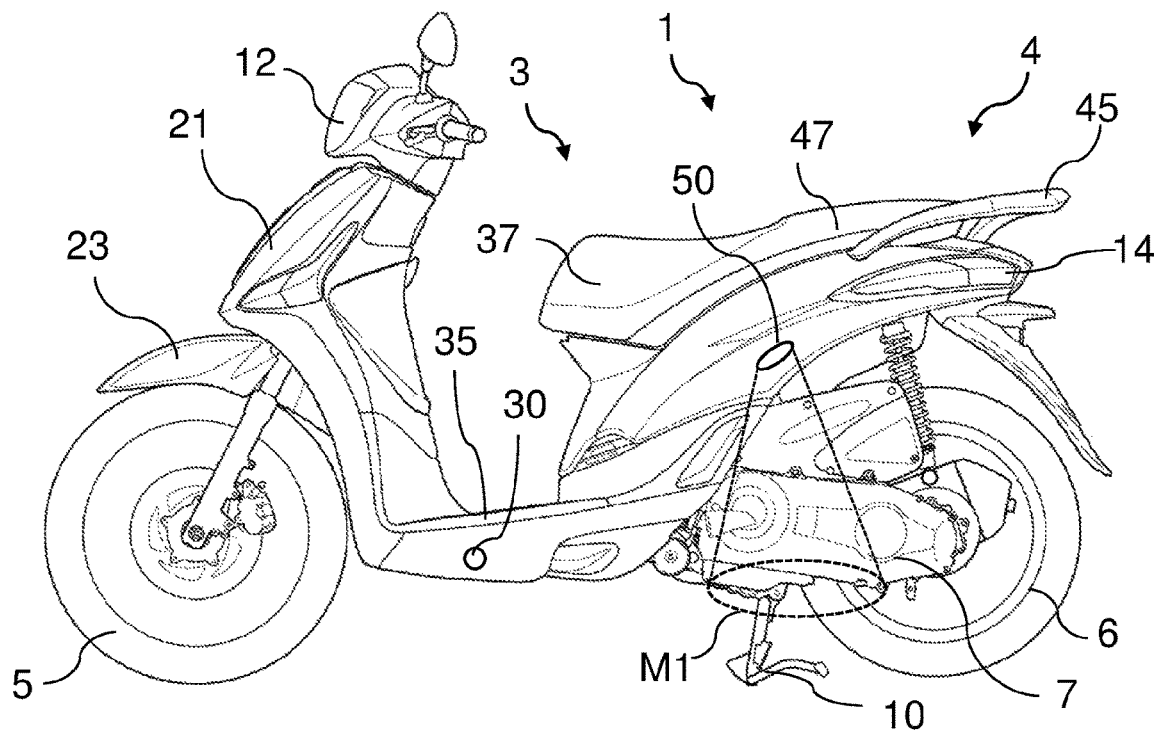
FIG. 4 shows a further side view of the motorcycle of FIG. 1, wherein the motorcycle is in one second operative configuration.

Referring to FIGS. 3 and 4, in case the aforesaid driver presence sensor 106 is present, such device may be for example used to establish the activation of the second auxiliary lighting device 50, if the latter is provided in the motorcycle 1, for example in order to deactivate the first auxiliary lighting device 30 and activate the second lighting device 50 when the driver gets off the motorcycle 1, thus passing from configuration of FIG. 3 to configuration of FIG. 4.

Figure 6:
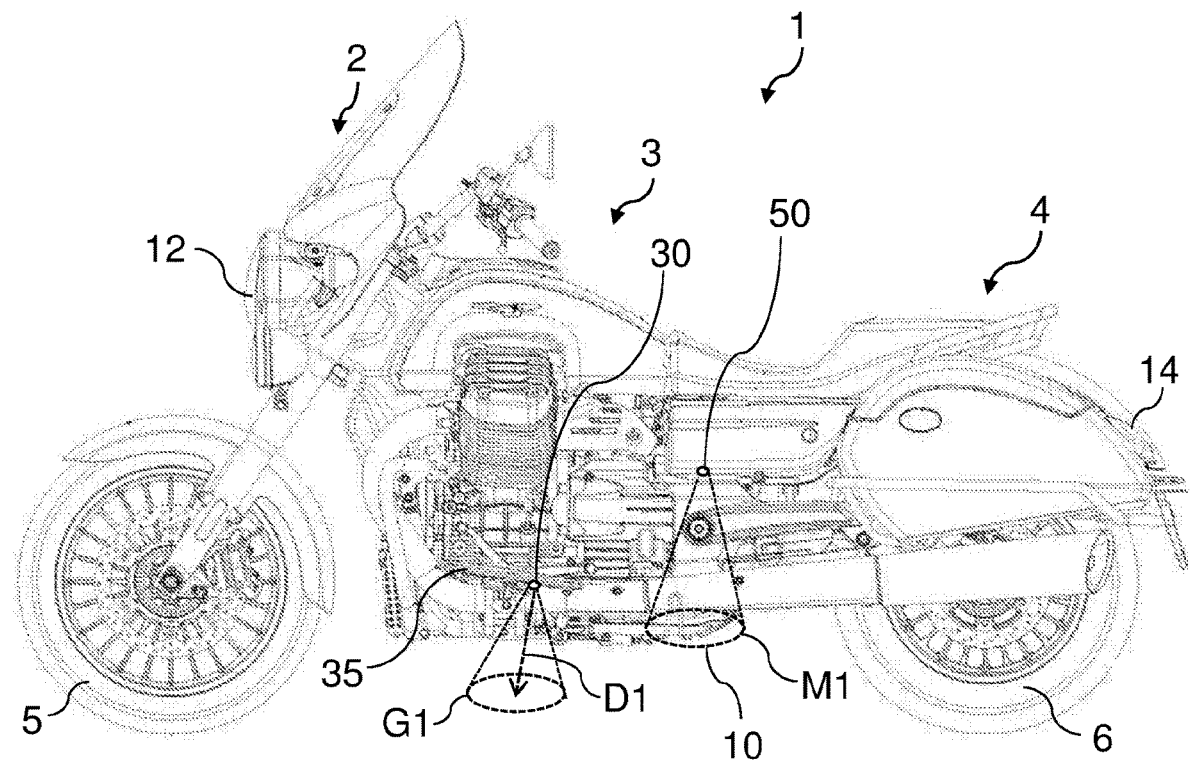
FIG. 6 shows a side view of one possible embodiment of a motorcycle alternative to the one of FIG. 1.

One alternative embodiment of the motorcycle of FIG. 1 is shown in FIG. 6. The motorcycle of FIG. 6 is a motorcycle and includes the first auxiliary lighting device 30 which is fixed to platform 35, in particular below the step up wall of the platform 35. It is possible to provide two first auxiliary lighting devices 30, one of which is fixed to the platform 35 of the right side of the motorcycle 1 and the other which is fixed to the platform 35 of the left side. Optionally, as illustrated in FIG. 6, in this motorcycle 1 too it is possible to provide the second auxiliary lighting device 50 adapted to light the kickstand 10 or render it luminous.

Without prejudice to the principle of the invention, the embodiments and the implementation details shall be widely varied with respect to what has been described and illustrated for exemplary purposes, without departing from the scope of the invention as defined in the enclosed claims.

The invention claimed is:

1. A motorized scooter including:
    a scooter body extending along a longitudinal axis and having a front part, a tail part and a central part comprised between the front part and the tail part;
    a generally horizontal platform disposed in the central part of the scooter body and configured to support the feet of a rider;
    a front shield disposed on the front part of the scooter body arranged generally upright relative to the platform and configured to protect legs of the rider during a forward travel;
    at least two wheels constrained to the motorcycle body, including a front wheel and a rear wheel;
    a traction engine constrained to the motorcycle body and operatively connected to at least one of the wheels;
    at least one headlight fixed to the front part;
    at least one rear light fixed to the tail part;
    a first auxiliary lighting device fixed to the motorcycle body and adapted to be electrically controlled in order to be activated and deactivated, wherein the first auxiliary lighting device is arranged and oriented so that, when activated, said first auxiliary lighting device lights a ground portion being on the side and/or under the central part of the motorcycle body;
    an electronic control unit operatively connected to the first auxiliary lighting device and configured to activate and deactivate said first auxiliary lighting device, wherein the electronic control unit is configured to automatically activate the first lighting device when the speed of the motorcycle is lower than a threshold speed;
    a twilight sensor operatively connected to the electronic control unit and wherein the electronic control unit is further configured to keep the first auxiliary lighting device off when detecting a certain degree of ambient lighting;
    wherein the first auxiliary lighting device is placed under the platform and arranged to illuminate and render visible the ground portion during stopping or parking operations.

2. The motorcycle according to claim 1, wherein the absolute value of the threshold speed is greater than zero.

3. The motorcycle according to claim 2, wherein said threshold speed is greater than or equal to 5 km/h.

4. The motorcycle according to claim 1, wherein the first auxiliary lighting device is arranged in the central part and is oriented towards the ground.

5. The motorcycle according to claim 1, wherein the first auxiliary lighting device has a main emission optical axis being oriented in a direction transversal to the longitudinal axis and facing the ground.

6. The motorcycle according to claim 1, further including a radio interface operatively connected to the electronic control unit and wherein the electronic control unit is programmed to activate the first auxiliary lighting device when said speed is equal to zero and when receiving a radio control signal from said radio interface.

7. The motorcycle according to claim 1, wherein the first auxiliary lighting device includes two auxiliary lighting devices being placed on opposite sides with respect to the longitudinal axis.

8. The motorcycle according to claim 1, further including at least one kickstand adapted to be moved in order to selectively assume a resting operating position and a working operating position, wherein, in the working operating position, the kickstand has at least one end portion leaning against a ground portion being placed laterally and/or under the body of the motorcycle, also including a second auxiliary lighting device adapted to light the kickstand or to render the kickstand luminous.

9. The motorcycle according to claim 8, wherein the second auxiliary lighting device is such to light the kickstand when the kickstand is in the resting position.

10. The motorcycle according to claim 8, wherein the second auxiliary lighting device is operatively connected to the electronic control unit in order to be thereby activated and deactivated, and wherein the electronic control unit is such to activate the second auxiliary lighting device when the speed of the motorcycle is equal to zero and/or the traction engine changes from an on state to an off state and/or the driver getting off from the motorcycle is detected.

11. The motorcycle according to claim 8, wherein the second auxiliary lighting device is integrated in the kickstand.

12. The motorcycle according to claim 8, wherein the second auxiliary lighting device is external to the kickstand, is fixed to the body of the motorcycle, and is oriented towards the kickstand when the kickstand is in the resting position.

* * * * *